United States Patent [19]
Visser, Anthony

[11] Patent Number: 4,947,582
[45] Date of Patent: Aug. 14, 1990

[54] APPARATUS AND METHOD FOR PLANTING OUT PLANTS

[75] Inventor: Visser, Anthony, 's-Gravendeel, Netherlands

[73] Assignee: Visser 's-Gravendeel Holding B.V., Netherlands

[21] Appl. No.: 379,255

[22] Filed: Jul. 13, 1989

Related U.S. Application Data

[62] Division of Ser. No. 68,351, Jul. 1, 1987, abandoned.

[30] Foreign Application Priority Data

Jul. 7, 1986 [NL] Netherlands .................. 86-01765

[51] Int. Cl.$^5$ .............................................. A01G 00/00
[52] U.S. Cl. ........................................ 47/101; 47/901; 111/104
[58] Field of Search .................. 111/105, 104; 47/901, 47/73, 83, 84, 85, 86, 101

[56] References Cited

U.S. PATENT DOCUMENTS 3,337,986  8/1967  Boucher .............................. 47/901
3,903,643  9/1975  Blackmore ........................... 47/77
4,408,549 10/1983  Quarström ........................... 47/901

FOREIGN PATENT DOCUMENTS 1570647  6/1981  Belgium ............................... 47/901
 313530  4/1989  European Pat. Off. ............ 111/105
8200027  8/1983  Netherlands ......................... 47/901

Primary Examiner—Henry E. Raduazo
Attorney, Agent, or Firm—Watson, Cole, Grindle & Watson

[57] ABSTRACT

This invention relates to an apparatus and a method for the planting out of plants wherein the plants to be planted out are fitted into pieces of substrate. Said pieces of substrate are located in compartments formed between blocks fitted onto strips. Usually these strips are located adjacent and each second strip is shifted lengthwise over the length of a block, being equal to the length of a compartment so that a chess-board-pattern develops in plan view. For the planting out, the strips are separated and subsequently supplied to a pushing element which pushes the pieces of substrate including the plants in a transverse direction out of the strip and into bigger containers. To use only a single directional movement the strips are inclined relative to the bigger containers. To compensate for this inclination the pieces of substrate are slightly rotated during the movement.

11 Claims, 3 Drawing Sheets

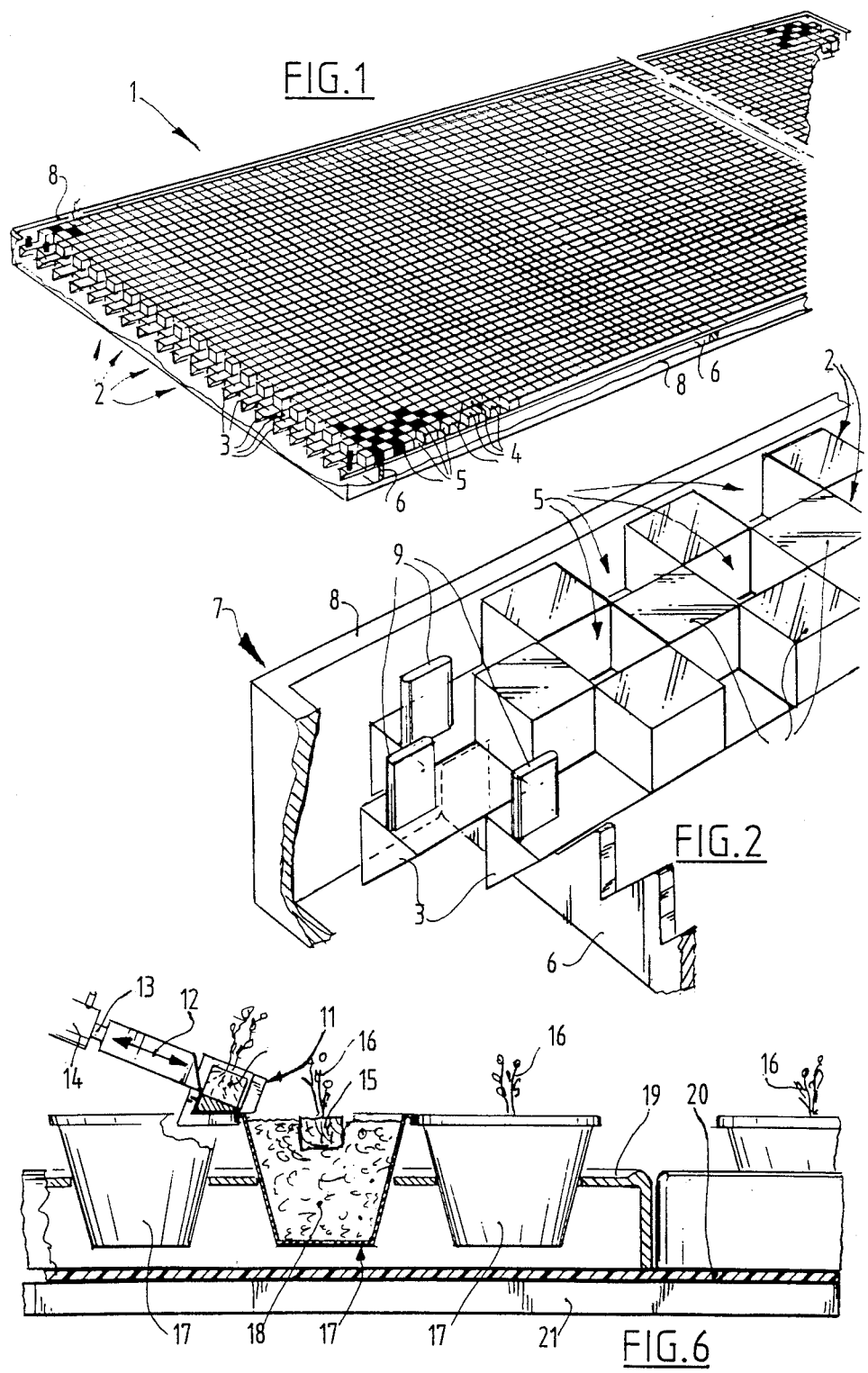

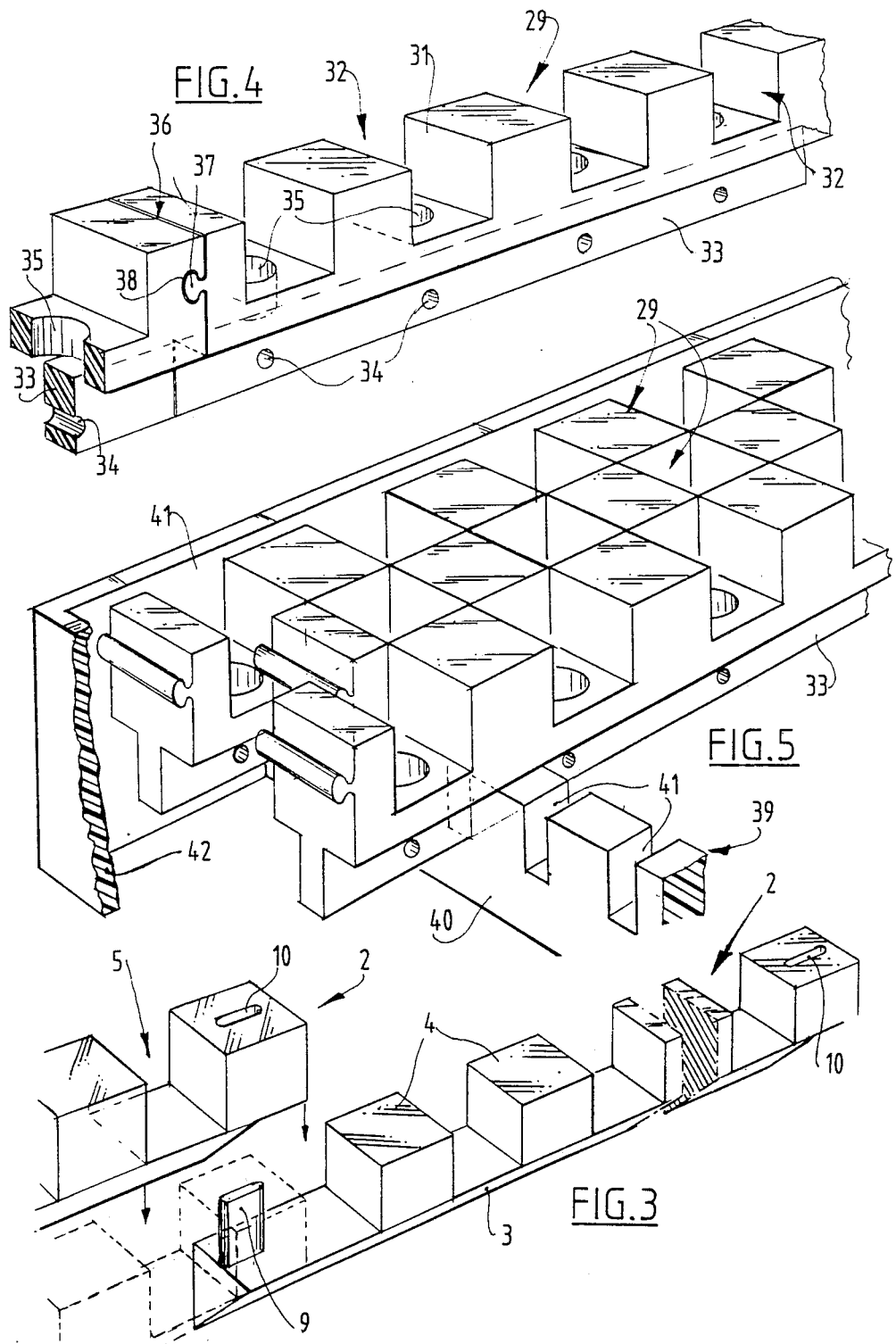

APPARATUS AND METHOD FOR PLANTING OUT PLANTS

This application is a divisional application of application Ser. No. 068,351, filed 07/01/87 and now abandoned.

BACKGROUND OF THE INVENTION

The present invention relates to a method for planting out of plants, wherein pieces of substrate located in each other's proximity and each comprising a germinated plant are relocated relative to each other.

Such a method is generally known.

If this known method is executed manually this is a labour-intensive and thus costly process. In the past trials have been executed to mechanise the planting out of plants.

Apparatuses for planting out of plants known hitherto had the disadvantage that the plants to be planted out where grasped with their pieces of substrate and were then moved from a small container to a large container. When grasped the plants were often damaged as the pieces of substrate where grasped from above.

Another disadvantage of this known apparatus for planting out is that, through the combination of the grasping of the pieces of substrate, the lifting of the pieces of substrate, and the execution of a horizontal movement and a downward movement into a larger container, a complicated execution develops, which cannot be executed fast. Further, it is remarked that for an economical use it is of utmost importance that the apparatus for planting out works fast as great numbers of plants have to be planted out.

SUMMARY OF THE INVENTION

One aim of the present invention is the providing of a method and an apparatus for planting out wherein the plants to be planted out are not damaged.

Another aim of the present invention is the providing of a method and an apparatus for the planting out of plants which allows fast processing.

Both aims are reached by a method and an apparatus for the planting out of plants, in which strips on which compartments are located with open walls perpendicular to the longitudinal direction of the strip are used for containers of the pieces of substrate, and wherein the pieces of substrate are pushed out of the compartments by a pushing movement which extends perpendicular to the longitudinal direction of the strips.

The present invention will be illucidated with the help of the accompanying drawings.

BRIEF DESCRIPTION OF THE DRAWINGS

FIG. 1: a perspective view partially broken away of an assembly of strips which is formed by strips according to a first embodiment of the invention located adjacent to each other.

FIG. 2: a perspective detailed view of an assembly of strips according to FIG. 1;

FIG. 3: a perspective view of two strips according to the first embodiment;

FIG. 4: a perspective view partially broken away of a strip according to a prefered embodiment of the invention;

FIG. 5: a perspective view of an assembly of strips according to FIG. 4;

FIG. 6: a cross-sectional view of an apparatus according to the present invention.

DETAILED DESCRIPTION OF THE PREFERRED EMBODIMENTS

Figure 7:
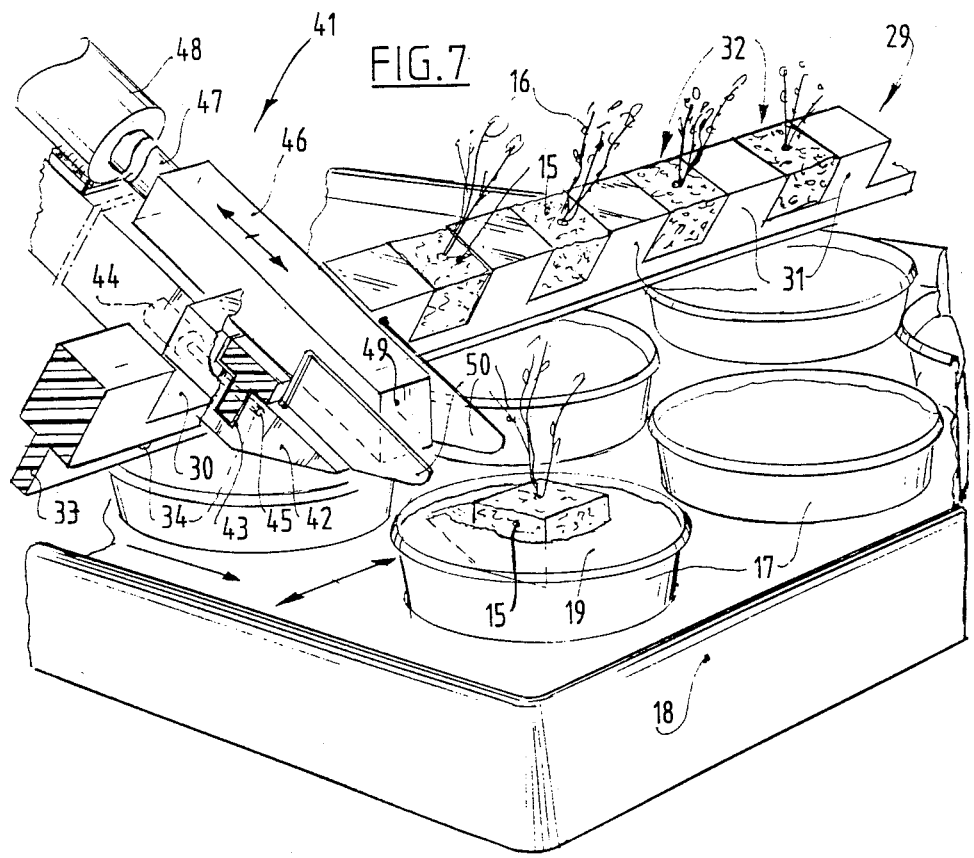
FIG. 7: a perspective view of a prefered embodiment of the apparatus according to the present invention.

The strip assembly 1 depicted in FIG. 1 comprises a number of strips 2, each comprising a supporting body 3 having a triangular cross-section. On the supporting body 3 cubes 4 are provided such as to keep compartments 5 open between the cubes 4 and wherein the size of the compartments 5 is equal to that of the cubes 4. The strips 2 including the cubes 4 are preferably of plastic and manufactured in one piece.

The perspective detailed view depicted in FIG. 2 shows how the strips 2 with their triangular supporting body 3 are located unto a supporting-wall 6. This supporting-wall 6 comprises sawtooth-shaped incisions, in which the supporting body 3 fits, so that the upper surface of the supporting body 3 is horizontal. The supporting-walls 6 form a part of a traylike container 7, which comprises side walls 8 so that a strip assembly 1 is provided which can be handled easily.

To connect the strips 2 each other after they have been taken out of the container 7, each of the strips comprises a connecting cam 9 on one end, whereas the end which is not depicted is provided with a connecting groove 10. To limit all four sides of the compartments between the cubes 4, adjacent strips are shifted mutually over the length of a cube so that the compartments are limited by the cubes of adjacent strips. Consequently the strip assembly 1 shows a chess-board-pattern in plan view.

The sawtooth-shaped incisions in the supporting walls are located such as to make the strips 2 contiguous.

For the germinating of the plants, growing material is spread over the strip assembly 1 so that this material enters all compartments 5, after which the remaining growing material is removed. With the help of a suitable machine, which is not a subject of the present invention, a seed is applied in every compartment, after which the strip assembly is put into a germinating cabinet. When the strip assembly has spent the required length of time in the germinating cabinet and when a sufficient number of seeds have germinated and the plants thus developed have come up sufficiently, the strip assembly 1 is removed from the germinating cabinet. According to this method the actual planting out of the plants, or the reduction of the density of the plants per area, is stepwise; in the first step the density is reduced in a first direction while in the second step the density is reduced in a second direction, perpendicular to the first direction.

In the method and the apparatus according to the present invention the first step takes place by the separation of the strips 2. The strips 2 are taken out of the container and are subsequently placed in a groove which is not depicted and wherein the strips are mutually connected by means of the connecting cams 9 and the connecting grooves 10.

The preferred embodiment of the strips according to the present invention depicted in FIG. 4 each comprise a bottom 30, onto which cubes 31 are located such as to form compartments 32 between the cubes 31 wherein the size of the compartments is equal to that of the cubes 31. A rail 33 is provided under the bottom 30. In this rail holes 34 are fitted in which engaging means can be inserted to make the strip move along. Further in the bottom 30 drainage openings 35 are provided on the location of each compartment 32. The sizes of these drainage openings 35 are such that these openings 35 are wider than the rail 33, so that each opening 35 discharges into the lower side of the bottom 30.

On one of each ends 36 each strip comprises a meander-shaped extension 37 and comprises on its other end 36 a simularly shaped thus as well meander-shaped cutaway 38. By means of the cutaway 38 and the extension 37 the strips can be connected to each other. This takes place by shifting the strips sideways into each other whereby possible contaminations are pushed out automatically. To enhance this self-cleaning action all edges of respectively the cutaway 38 and the extension 37 are rounded off, thus developing the meander-shape.

FIG. 5 shows how a number of the strips 29 are adjacently located in a container 39. The container 39 comprises at least two cross-beams 40, in which incisions 41 are made wherein the respective rails 33 fit. The incisions 41 have such a mutual distance that the strips 39 are closely contiguous when the are located into the container 39. By shifting every second strip 39 over the length of respectively one cube or one compartment, a chess-board-pattern develops so that every compartment is surrounded by four walls.

To limit the outer strips 29 the container 39 has been provided on its sides of sidewalls 42a. Front and rear walls 42b are fitted as well. During the planting out the strips 29 are taken out of the container 39 one by one and located onto a supply groove and are coupled with the preceding strip so that the strips are supplied to the apparatus for planting out according to the present invention.

In FIG. 6 the planting out in the second direction is illucidated; the strips 2 connected to each other are supplied in a groove 11. In its sidewalls 2 the groove 11 has opposite openings, through where a pushing element 12 is moveable. This pushing element 12 is connected with a piston rod 13 of a linear pneumatic driving device 14. When the compartment 5 with the piece of substrate 15, in which a plant 16 is located, is placed between the two openings provided in the sidewalls 11, the pushing element 12 pushes the piece of substrate 15 from the compartment 5 through one of the openings into a bigger container 17. Because the pushing movement extends only in one direction, the container 17 is located in the extension of the path of the pushing element 12. The piece of substrate 15 has to be driven into the growing material inside the container 17 as far as possible. Nevertheless the position of the plant 16 has to be maintained as much as possible in the direction extending perpendicular to the upper side of the growing material. To reach this aim the plane formed by the tops 17a of the containers 17 is inclined at an acute angle with regard to the direction of movement of the pushing element. This inclination is limited as much as possible to keep the plant 16 in its original position. The container 17 is located so that the piece of substrate 15 moves just over the edge of the container 17 into the growing material 18. The growing material 18 is so soft that the harder piece of substrate 15 will move into it.

When this process has been completed the pushing element 12 moves back until its original position and the strip 2 is moved over the sum of the lengths of a compartment and a cube, the container 17 is moved over the length of one container, after which the process is repeated. The groove 11 is provided with driving organs which engage with the empty compartments 5 to move the strips connected to each other.

The containers 17 are placed in container trays 19, which are located unto a conveyor belt 20. By having the conveyor belt 20 moving over the length of a container the next pot 17 is located in front of the pushing element 12. As such, the conveyor belt acts as a means for intermittent supply and removal of the containers. To bear the weight of the pots and of the container trays a supporting plate 21 is located under the conveyor belt 20.

FIG. 7 shows a preferred embodiment of the apparatus for the planting out of plants. This apparatus makes use of the preferred embodiment of the strips 29. It would also be possible to make use of the strips depicted in FIG. 3, for which the apparatus would have to be adapted. This preferred embodiment comprises a guide over which the strip is supplied. This guide is in the drawing depicted only on the place of the pushing element and has been designated by number 42. The guide 42 comprises a groove 43 in which the rail 33 of the strip 29 fits. On the location of the pushing element a conveying mechanism 44 is provided for moving the strip 29 concerned over one pitch, or the sum of the lengths of a cube and a compartment. This conveying mechanism comprises a moveable pin 45 which can engage into the holes 34 fitted in the rail 33 and thus can convey the rail 29 further. A pushing element has been provided, which is a rod 46 driveable by a driving device 47, for instance a solenoid or a hydraulic or pneumatic cylinder. The pushing element 46 comprises an inclined surface 49 which pushes the substrate 15 with the plant 16 therein from the compartment 32 into the growing material 19 in the container 17. To have the piece of substrate 15 inclining during this movement, which is necessary because the strip 29 is located inclined with regard to the containers 17, on both sides of the path which has to travel over by the piece of substrate 15 resilient engaging members 50 are applied which offer such a friction to the piece of substrate 15 that this inclines as a consequence of the inclined surface 49 of the pushing element 46 and takes the right position in the container 17.

Figure 8:
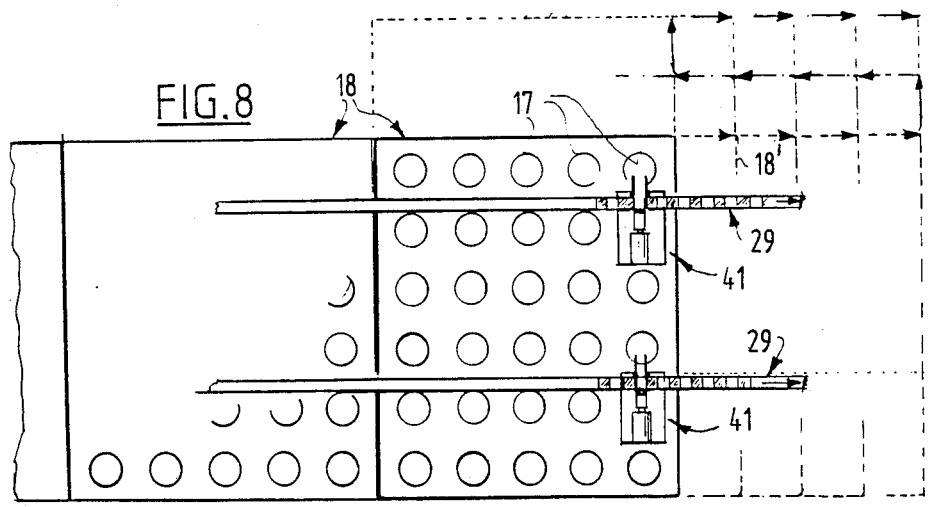

FIG. 8 shows a schematic plan view of two apparatuses according to the present invention working simultaneously. When two apparatusses working simultaneously are used, the danger develops that the plants, planted out by the first apparatus are "decapitated" by the second apparatus. To avoid this the container trays, wherein the containers are located into which the plants are planted out are moved such that initially the container tray for the purpose is moved in one direction parallel to the longitudinal direction of the strips and subsequently one row of containers is shifted and is moved back in the direction parallel to the longitudinal direction, and subsequently shifts one row of containers again. Of course this can be extended to the required number of rows of pots.

I claim:

1. Apparatus for planting out plants comprising a plurality of open top containers which have tops that lie substantially in a first plane, a holder of pieces of substrate having plants growing therein, said holder including an upper surface lying substantially in a second plane inclined to said first plane, and a reciprocating pushing element movable along a path which is inclined at an acute angle to said first plane.

2. Apparatus according to claim 1, wherein the reciprocating pushing element has a pushing surface which is substantially perpendicular to the upper surface of the containers.

3. Apparatus according to claim 2, wherein the path of the pushing element is limited sideways by engaging members urged towards the path on both sides.

4. Apparatus according to claim 2, including means for intermittent supply and removal of containers.

5. Apparatus according to claim 2, including at least one detector provided in the supply path of the strips to detect the condition of the plants and means for selectively supplying the plants to the reciprocating pushing element.

6. Apparatus according to claim 4, including at least two detectors provided in the supply paths for simultaneously detecting the condition of at least two plants.

7. Apparatus for transferring pieces of substrate having plants growing therein from compartments of elongated strips to containers having growing material therein adapted to receive pieces of substrate having plants growing therein comprising, a plurality of containers having growing material therein and open tops, means for supporting said containers with the tops thereof disposed substantially in a plane, pushing means mounted for movement in a first direction inclined at an acute angle relative to said plane, means for moving said containers with respect to said pushing means to align different ones of said containers with said pushing means along said first direction, an elongated strip having spaced compartments containing pieces of substrate having plants growing therein, said compartments having solid floors and a pair of opposed open sides, support means for supporting said strip for movement in a second direction extending substantially perpendicular to said first direction, means for moving said strip in said second direction relative to said pushing means to align different compartments of said strip with said pushing means, and means for operating said pushing means in said first direction when said first direction is aligned with the open top of one of said containers to push a piece of substrate having a plant growing therein through an open side of a compartment of said strip and to drive the piece of substrate into the growing material within said one container.

8. Apparatus as defined in claim 7, wherein said pushing means includes a pushing surface engageable with pieces of substrate having plants growing therein, said pushing surface being inclined to said first direction and being disposed substantially perpendicular to said plane.

9. Apparatus as defined in claim 7 including engaging means for engaging a piece of substrate as it is being pushed by said pushing means to cause a side of the piece of substrate to be aligned with said pushing surface so that a plant growing in said piece of substrate will be properly aligned within said container.

10. Apparatus as defined in claim 9 wherein said engaging means includes resilient means engageable with said piece of substrate and which resists movement of said piece of substrate.

11. Apparatus as defined in claim 10 wherein said resilient means comprises a pair of resilient members engageable with opposite sides of a piece of substrate.

* * * * *